Jan. 19, 1943.  J. L. RAESLER  2,308,933
PSYCHO-GALVANOMETER
Filed Jan. 8, 1941  2 Sheets-Sheet 1

Inventor
J. L. Raesler,
By _____
Attorney.

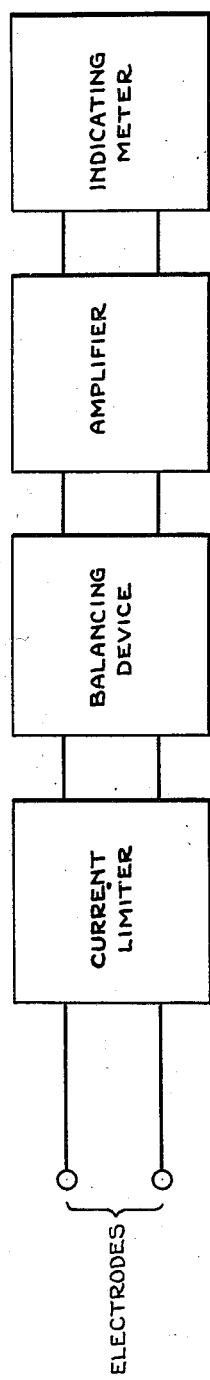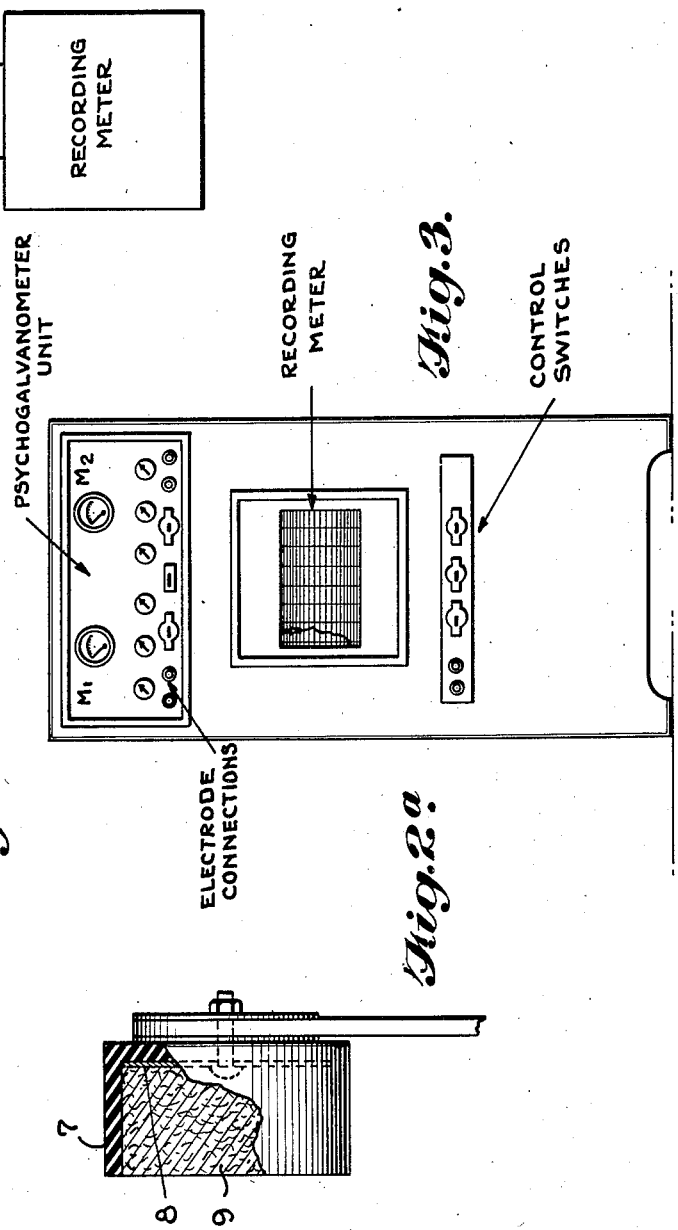

Patented Jan. 19, 1943

2,308,933

UNITED STATES PATENT OFFICE 2,308,933

PSYCHOGALVANOMETER

John Leo Raesler, Auburn, N. Y., assignor of one-third to Chester J. Bills and one-third to Charles D. Osborne, both of Auburn, N. Y.

Application January 8, 1941, Serial No. 373,670

4 Claims. (Cl. 128—2.1)

This invention relates to a method of and apparatus for measuring psychogalvanic responses.

Psycho-galvanometers have long been known and used with varying degrees of success. Constant improvement has materially increased their sensitivity but they still cannot be definitely relied upon to give an accurate indication of the factors which it is desired to study. Changes in circuit and application of electrical equipment which might have little effect on other types of measuring instruments may materially affect the operation of a psycho-galvanometer.

The primary object of the present invention is to improve the efficiency of psycho-galvanometers. More particularly, the invention aims to increase the sensitivity and factor selectivity of psycho-galvanometers and at the same time simplify their construction and operation.

Generally stated, the method consists in initiating a controlled flow of direct current through the body under test and maintaining the current constant while measuring variations in potential due to changes in body resistance resulting from emotional or physical stresses.

The various features of novelty and advantages inherent in the improved psycho-galvanometer will become apparent in view of the following description taken in conjunction with the drawings, wherein:

Fig. 2 is a schematic diagram of the units which make up the apparatus;

Fig. 2a is a detail view in sectional elevation of a preferred form of electrode;

Fig. 3 is a view in front elevation of the apparatus housed in a cabinet.

Figure 1:
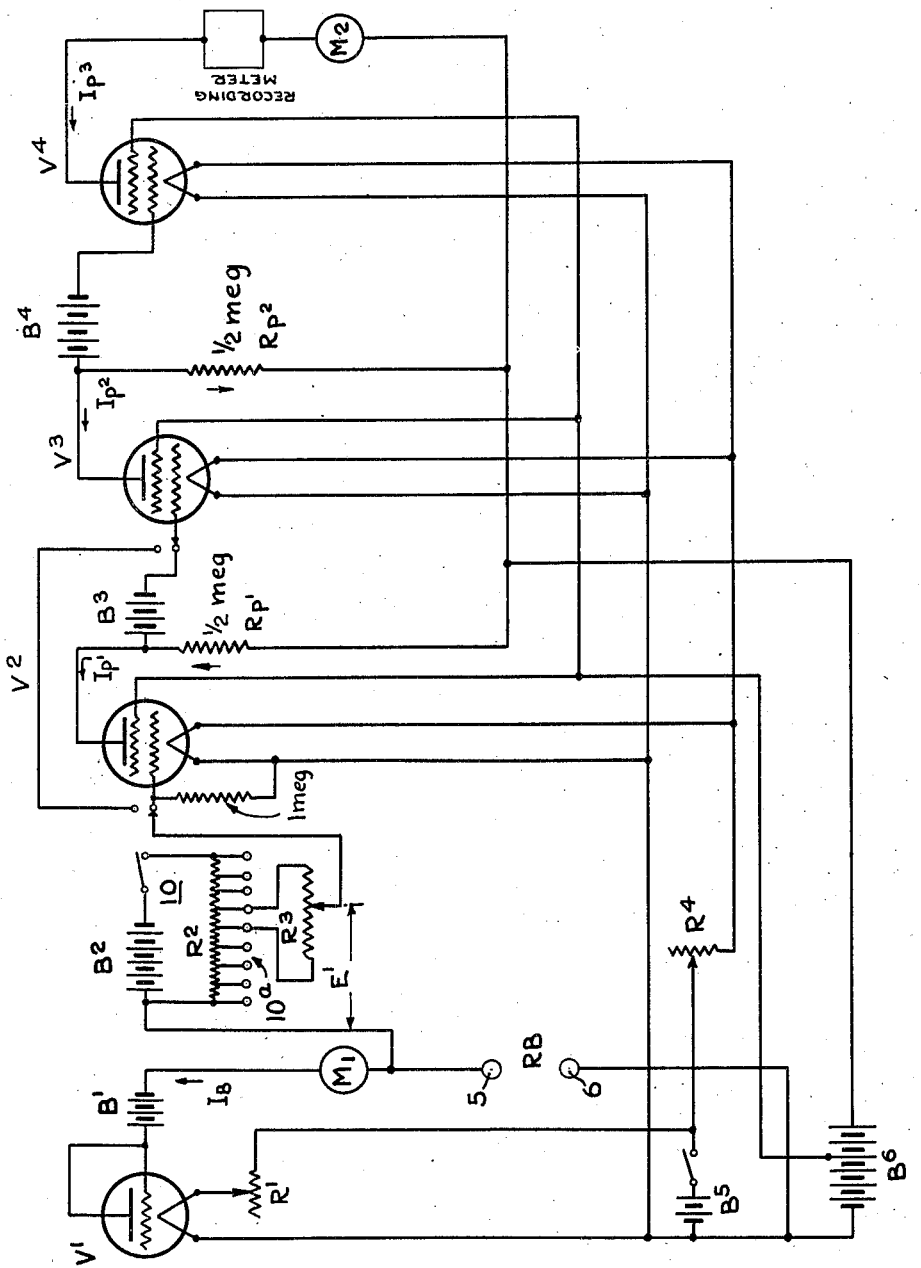
Fig. 1 is a diagram of the electric circuit for the improved psycho-galvanometer of the present invention.

Referring to the drawings in detail, a pair of electrodes are indicated at 5 and 6, each of which preferably comprises a cup 7 of insulating material such as Bakelite having a conductor in the form of a plate 8 of aluminum or the like in the base thereof, note Fig. 2a. The cup 7 is adapted to receive absorbent material such as a small sponge 9 saturated with a fluid of high conductive properties, for example, a five per cent solution of sodium hypochlorite. This type of electrode ensures an effective contact in that any irregularities in the part to which the electrode may be connected, such as the palm of the hand, are compensated for, such irregularities being filled with liquid and the area of contact remaining constant as well as the contact resistance after the liquid has permeated the skin.

Referring particularly to Fig. 1, RB indicates body resistance. Tube VI is connected as a diode to limit the amount of current passed through the body. Electron flow through tube VI is controlled by rheostat RI which adjusts the filament temperature. Plate and grid voltage to this tube is supplied by battery BI, and if there is any tendency of the battery voltage to decrease during a test due to polarization, it is overcome by the limiting action of the diode.

A balancing unit is provided and comprises potentiometer 10 having contacts 10a and resistances R2 and R3. Electrode 5 connects to the input to the amplifying unit through R2 and R3.

The amplifier unit is of the direct current type and as here shown embodies three stages made up of tubes V2, V3 and V4. Plate voltage is supplied by batteries B3 and B4 and grid voltage by battery B6. Rheostats or resistances $Rp1$ and $Rp2$ are used as plate circuit load resistors. Filament voltage is supplied by battery B5 and is controlled by rheostats R4 and RI.

Indicating meter MI is inserted in the test circuit to indicate the body current, and another meter M2 is inserted in the amplifying circuit.

The body resistance RB varies during the test, and accordingly there is a variation in the voltage drop across this resistance. Before beginning a test, the potentiometer 10 is adjusted by means of R2 and R3 so that the voltage drop across RB equals EI. In other words, the voltage at EI should be exactly equal to and of opposite polarity to the voltage drop across RB. When this happens, the voltage applied to the grid of V2 is nil. The voltage drop across $Rp1$ equals $Ip1 \times Rp1$ and this is reduced by battery B3, so that the grid voltage of V3 is proper for normal operation as a class A amplifier. This same procedure is followed in the remaining stages until the final plate current $Ip3$ flows through the indicating meter M2.

In normal operation, the subject or person under test has the electrodes 5 and 6 connected to the palm of the hand or other suitable part of the body. Filament of tube VI is then adjusted by means of RI until meter MI shows 0.25 milliampere body current. R2 and R3 are now adjusted until meter M2 shows full scale reading or slightly less. A preliminary test will indicate if the sensitivity is great enough for the person being tested. If not, the body current may be increased to 0.50 or 0.75 ma. As the test develops, any increase in emotional activity in the subject will cause a decrease in body resistance (RB) which is proportional to such emotional activity. In the ordinary application of a non-saturated electrode to the surface of the skin of the subject for purposes of emotional stress measurements, the change in conductivity of the skin surface is caused largely by increased activity of the sweat glands and results in a decrease rather than an increase in the conductivity of the skin surface because of the more intimate connection presented to the electrode by the change in moisture content between the electrode and the skin pres. However, I use an electrode saturated with an ionizable and highly conductive saline solution which is limited to a fixed area of the skin surface so that the resistance due to changes in area of contact are negligible. Also, the changes in conductivity by a change in the amount of perspiration on the skin are a negligible quantity since the surface is already saturated and covered intimately with the conducting solution. The only chance for a change here would be caused by inability of the electrode solution to permeate the skin's surface. However, by leaving the electrodes attached for a short period before conducting the test, the skin penetration of the electrolyte in the electrode becomes quite complete.

Now, since the contact resistance is made practically constant, the only changes that are able to cause a change in body resistance are those changes that occur in the cells of the body. These cells undergo a certain chemical change due to energy released by emotional stresses in the body which acts to reduce the body resistance. This is apparently caused by an increased rate of decomposition or ionization in each cell. There seems no more direct proof that this is so other than the substitution of a known resistance which will simulate changes in body resistance under stress. When the substituted resistance is decreased in value, remembering that the contact resistance is constant because of the action of the saturated electrode, the meter deflection is identical to that observed when increased emotional stress is evinced by the test subject. This decrease will cause a decrease in the voltage across the body (RB) so that $E1-RB=0$ and the voltage $(E1-Ib\ RB)$ will be impressed on the grid of V2, which will increase the plate current $Ip1$. Voltage $Ip1 \times Rp1$ will increase and the negative voltage will be correspondingly increased to the grid of V3 which will decrease the current $Ip2$. This change will be directly proportional to the change occurring in body resistance but will be much greater due to amplification. While three stages of amplification are illustrated, two will ordinarily be sufficient. The amplifier should be a direct coupled unit due to the extremely low frequency of the changes in resistance which occur during test.

In Fig. 1 a recording meter is shown for indicating the variations in plate current of tube V4 resulting from changes in body resistance across terminals 5 and 6. This meter may be used to obtain a permanent record of a subject's reactions for future reference. The meter may have a scale range of 0 to 5 milliamperes, which is the approximate value for the circuit here shown.

From the foregoing, it will be seen that the device measures a potential across the body which is caused by direct current flow through the body from an external source, such changes in potential arising due to changes in resistance of the body and not due just to the current flow through the body. The use of direct current is important, since alternating current sets up capacity effects between the body and ground which cause a change in readings not attributable to the changes which it is desired to study or measure. Tube V1, connected as a diode, provides a very convenient method of adjusting the current flow through the body, using a thoriated filament tube.

Fig. 3 illustrates the unit mounted in a cabinet with the various controls accessible at the front of the cabinet. Parts which correspond to those shown diagrammatically in Fig. 1 are given like reference characters in Fig. 3.

Actual experience has demonstrated that the device is highly sensitive and is unusually accurate in measuring or indicating emotional stresses which occur in the human body.

It will be understood that certain changes in construction and design as well as arrangement of the electrical circuit may be adopted within the scope of the invention as defined by the appended claims.

What is claimed is:

1. In apparatus for measuring psychogalvanic responses in a human body, an electrical circuit including electrodes adapted to be connected to the body, said electrodes carrying a substance having a high coefficient of electrical conductivity capable of permeating the surface of the skin of the body, means for causing a flow of direct current in said circuit and through the body, a vacuum tube having an anode and cathode connected in said circuit as a diode to maintain a predetermined flow of current through the body, a potentiometer connected into said circuit to balance the latter preliminary to a test, a direct current amplifier arranged to amplify the variations in potential due to changes in body resistance, and a meter for indicating or recording such changes.

2. In apparatus for measuring psychogalvanic responses in a human body, an electrical circuit including electrodes adapted to be connected to the body, said electrodes carrying a substance having a high coefficient of electrical conductivity capable of permeating the surface of the skin of the body, means for establishing a flow of direct current in said circuit and through the body, a vacuum tube having an anode and cathode connected as a diode in said circuit to maintain constant the flow of current through the body, means for adjusting the filament voltage of said tube to in turn adjust the current flow through the body, a meter for visibly indicating body current, a potentiometer connected into said circuit and adjustable to balance the latter preliminary to a test, a multi stage direct current amplification unit including vacuum tubes whose input circuit is connected to said potentiometer and whereby any changes in body resistance are impressed on the grid of the amplifying circuit, and a meter for indicating such amplified changes.

3. In apparatus for measuring psychogalvanic responses in a human body, an electrical circuit including electrodes adapted to be connected to spaced points of the body, said electrodes carrying a substance having a high coefficient of electrical conductivity capable of permeating the surface of the skin of the body, means for establishing a flow of direct current in said circuit and through the body, a vacuum tube having a cathode and anode connected in said circuit as a diode to maintain constant the flow of current through the body, a rheostat for adjusting the filament of said tube to in turn adjust the current flow through the body, a meter for visibly indicating body current, an amplifying circuit indicating body current, an amplifying circuit including a plural stage direct current amplifying unit having vacuum tubes and a grid circuit, a potentiometer having one terminal connected to said first named circuit and another terminal connected to the grid circuit for balancing the circuit preliminary to a test, and a meter connected into the final stage of the amplifying circuit for indicating amplified changes in body resistance.

4. The method of measuring psycho-galvanic responses in a human body, which consists in applying to a limited area of the skin of a patient a pair of electrodes carrying a fluid having a high coefficient of electrical conductivity which permeates the surface of the skin, maintaining the contact resistance substantially constant while initiating a constant flow of direct current through the body, and measuring the variations in potential across the body resulting from changes in resistance of the body.

JOHN LEO RAESLER.